United States Patent [19]
Bott et al.

[11] 4,061,014
[45] Dec. 6, 1977

[54] BOTTLE INSPECTION APPARATUS

[76] Inventors: Gerald J. Bott, 1941 Westwood Drive, NE., Grand Rapids, Mich. 49505; William C. Porter, 7530 28th Ave., Hudsonville, Mich. 49426; Terrance M. Nowak, 1510 Pine, NW., Grand Rapids, Mich. 49504

[21] Appl. No.: 736,264

[22] Filed: Oct. 27, 1976

[51] Int. Cl.$^2$ ............................................. G01M 3/32
[52] U.S. Cl. ...................................... 73/45.1; 73/49.8
[58] Field of Search ...................... 73/40, 41, 45, 45.1, 73/45.2, 149; 209/80

[56] References Cited
U.S. PATENT DOCUMENTS

| | | | |
|---|---|---|---|
| 2,534,830 | 12/1950 | Philo | 73/40 |
| 2,606,657 | 8/1952 | Berthelson | 73/45.1 |
| 3,224,252 | 12/1965 | Hamilton | 73/49.2 |
| 3,310,283 | 4/1967 | Fitzpatrick | 73/40 |
| 3,409,128 | 11/1968 | Hutaff | 209/80 |
| 3,495,441 | 2/1970 | Laub | 73/45.2 |
| 3,496,761 | 2/1970 | Powers | 73/45.2 |
| 3,744,306 | 7/1973 | Krueger | 73/149 |
| 3,805,593 | 4/1974 | Sandoz | 73/41 |

*Primary Examiner*—S. Clement Swisher
*Attorney, Agent, or Firm*—McGarry & Waters

[57] ABSTRACT

A bottle inspection apparatus has an inspection stand and sorter for sorting defective plastic bottles from conforming bottles. The inspection stand has an extendible rod. A conical shaped nozzle is mounted at the end of the rod. The conical nozzle seals itself against a bottle aperture when extended for a predetermined amount of time. A low pressure air stream is operably connected to the nozzle and passes through the nozzle and into the inspected bottle. A pressure sensitive switch means is operably connected to the low pressure air stream. A blocking solenoid valve is operably attached to the pressure sensitive switch means and controls a high pressure air stream sorter. The pressure switch is actuated when a sufficiently high pressure is built up within the bottle within the predetermined limited amount of time the conical nozzle is sealing the bottle aperture. The blocking solenoid is deactivated when the pressure sensitive switch means is actuated. The high pressure air stream passes through the solenoid valve when the solenoid valve is deactivated. The air stream sorter, when activated, directs a conforming bottle onto a conveyor. A holding relay is operably attached to the solenoid valve circuit to maintain required information concerning the pressure build-up in an inspected bottle until the bottle is sorted by the high pressure air stream sorter.

19 Claims, 6 Drawing Figures

U.S. Patent   Dec. 6, 1977   Sheet 1 of 2   4,061,014
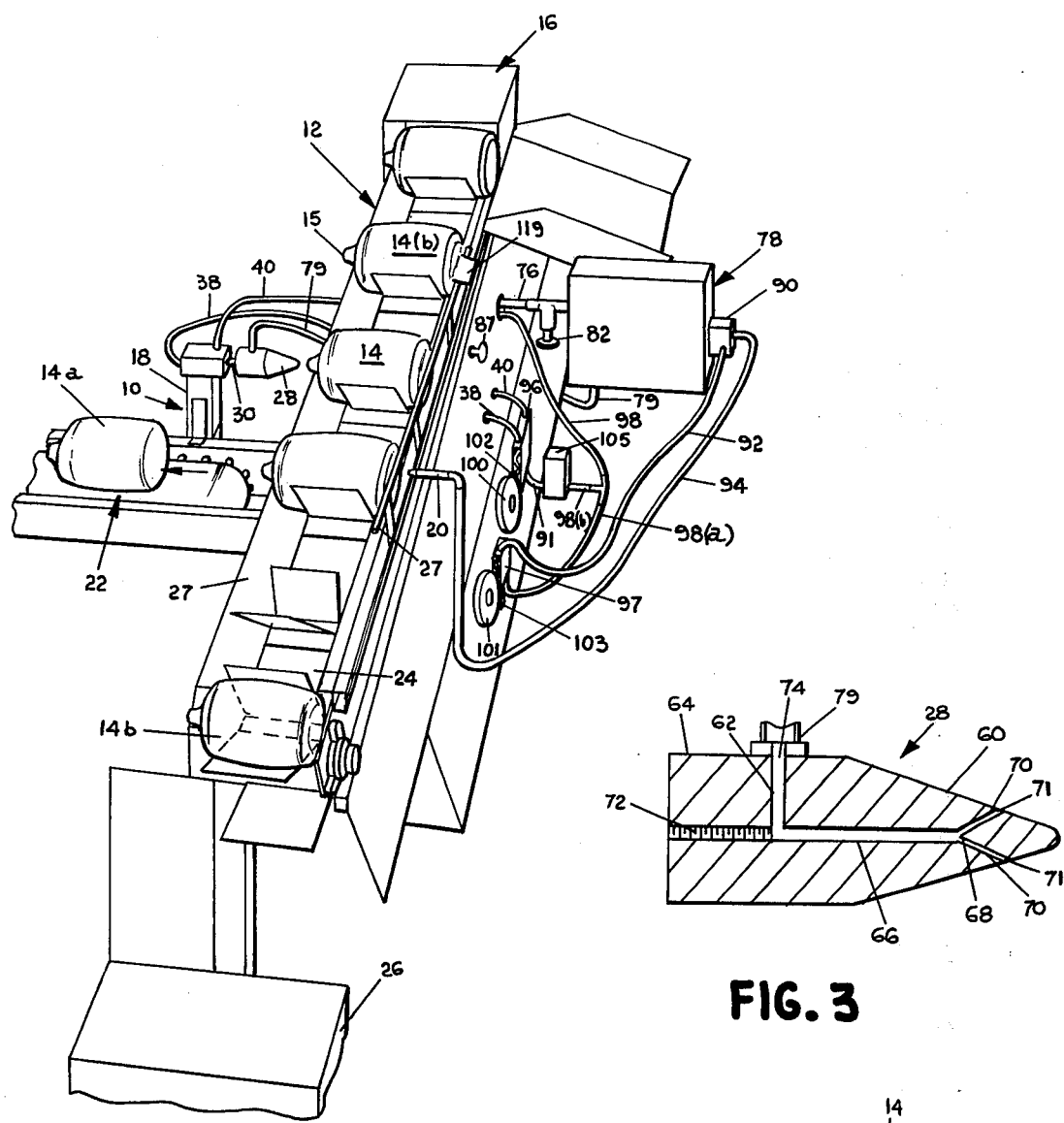
FIG. 1
FIG. 3
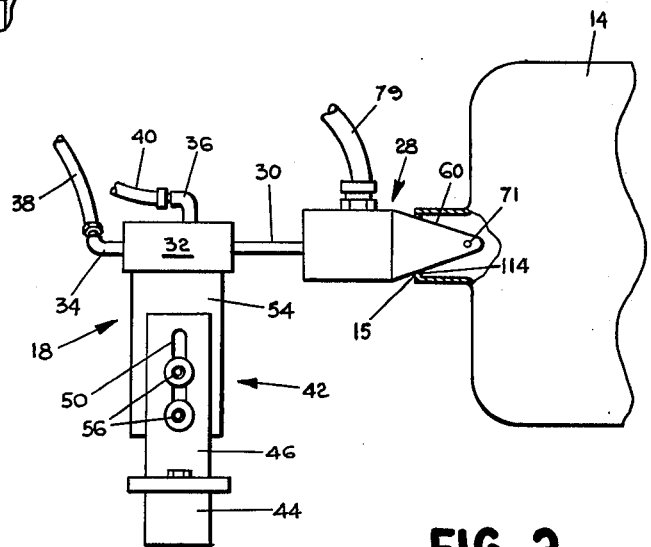
FIG. 2

BOTTLE INSPECTION APPARATUS

BACKGROUND OF THE INVENTION

1. Field of the Invention

This invention relates to bottle inspection systems and more particularly to bottle inspection systems using pressurized air in a timed cycle to detect leaks and dents in blow molded plastic bottles.

2. Description of the Prior Art

Blow molded plastic bottles have gained popularity and have greatly replaced glass bottles or other containers. Blow molded plastic bottles are relatively inexpensive and are unbreakable.

In recent years, the cost of plastics has greatly increased. On the other hand, the thickness of the plastic wall of the blow molded plastic bottles are greatly decreased to compensate for the increase in price. One of the incident problems resulting from the decrease in the thickness of the walls has been the increase incidence of pinholes and other defects such as dents or uncut flanges. The use of a defective bottle that has a pinhole is a loss in not only the bottle but also contents that have been placed within the bottle. The loss of the contents within the bottle is often many times the original cost of the bottle.

A bottle having a dent is also defective in that a certain sized bottle will not contain the predetermined amount of liquid or other contents if it has such a dent. The shortage of the material within the container can have bad side effects such as angry consumers and returned goods.

A bottle having a defective aperture is also defective. Plastic caps seal the blow molded bottles. The plastic cap has a wedge or ridge that abuts the inner edge of the bottle aperture. To promote a tight seal between the cap ridge and aperture, the aperture has an inwardly extending flange which is depressed by the ridge of the cap. If the aperture is not round or has a notch within its flange, the plastic cap will not adequately seal the aperture.

A bottle having an uncut flange can jam a conveyor line and cause a loss worth much more than the bottle itself. A flange can tip the bottle so it can get caught by a post or other obstacle adjacent the conveyor. Other bottles proceeding along the conveyor will be blocked by the caught bottle and can tip off of the conveyor or can back up causing a temporary shut down in operation while the bottles are straightened out. The bottle having an uncut flange can also get caught within a filling station and cause the loss of contents to be filled within that bottle.

A bottle inspection system is needed to detect both leaks and dents and other imperfections in the blow molded plastic bottles. An apparatus is needed to detect dents and leaks without permanently distorting the bottle by use of any excess testing pressure within the bottle container.

Previous testing apparatus have used either air pressure or a predetermined volume of air to detect leaks within the walls of the bottle. One such apparatus is disclosed is U.S. Pat. No. 3,495,441 issued to Laub on Feb. 17, 1970. The Laub patent discloses a leak detector that uses air pressure to determine a leak within plastic containers. The apparatus has a plurality of extendible shafts that ride upon a cam to follow a circular conveyor. The shafts have a spout which can extend into an aperture of the bottle. The bottle aperture is sealed against two sealing washers. Air is pumped into the bottle through the spout until a pressure switch is opened which cuts off the air to the bottle. If the bottle loses pressure while sealed, the pressure switch is reclosed and an ejection mechanism is activated. The ejection mechanism consists of a holding relay which activates a solenoid. The solenoid controls an air ejection nozzle so that if a defective bottle is tested, the ejection nozzle blows the bottle off the conveyor.

Another leak detector is disclosed in U.S. Pat. No. 3,805,593 issued to Sandoz et al on Apr. 23, 1974. The Sandoz patent discloses an apparatus that is completely self-contained and does not require an outside pressure source. A spout is introduced into a bottle and sealed therein. The spout is operably attached to a piston and cylinder. The bottle is lifted up with elevation of an apparatus platform which also lifts the cylinder. The piston is stationary and forces air from the cylinder into the bottle. Air pressure is created therein and is detected by a pressure sensitive switch.

With the advent of thinner plastic bottles, an apparatus is needed to detect dents within the bottle and uncut flanges as well as leaks.

SUMMARY OF THE INVENTION

According to the invention there is provided a method for inspecting plastic bottles for holes, dents and other imperfections. The method comprises injecting gas into the bottle at a given rate, measuring the rate of pressure build up in the bottle and sorting the bottles according to whether the rate of pressure build up is as great as or falls below a predetermined value.

Further, according to the invention, an apparatus is provided for inspecting bottles such as blow molded plastic containers to detect various defects in bottles such as holes, dents, malformations, uncut flanges, and the like. The apparatus includes a nozzle shaped to engage a bottle aperture and having means providing a sealing surface with the bottle aperture when the nozzle is in engagement. The nozzle further has a passage therethrough opening to the interior of the bottle. Further, means are provided for supplying gas at a first pressure to the nozzle passage so that gas can be supplied to the interior of the bottle when the nozzle is in sealing engagement with the aperture thereof. Means measure the rate at which the pressure builds up in the bottles when the nozzle is in sealing engagement with the aperture thereof and means are coupled to the measuring means for indicating whether the rate at which pressure builds up in the bottle is above or below a predetermined rate. In this manner, the presence of the holes, as well as the dents and deformation in the bottles can be detected with the inspecting system.

Desirably, the gas supply means includes a conduit connected to the nozzle passage and the rate measuring means includes means to detect the presence of a second predetermined pressure in the gas supply means conduit, the second predetermined pressure being above the first pressure of the gas supply means. Further, there are means for moving the nozzle and bottle with respect to each other in a timed cycle such that the nozzle is in sealing engagement with the bottle aperture for a predetermined length of time. Means regulate the flow rate in the gas supply means conduit such that the pressure in the conduit reaches a second predetermined pressure just before the end of the predetermined length of time when the nozzle is in sealing relationship with the aperture of a perfect bottle. Thus, if the bottle is perfect, the predetermined pressure will be reached at the end of the predetermined time. If the bottle is imperfect, the predetermined pressure will not be reached during the predetermined time. If the bottle has a dent, the gas pressure in the bottle will gradually expand the dent and the rate of pressure increase will be less than the predetermined rate due to the increase volume of the bottle as the dent is partially blown out.

Further, according to the invention, a bottle inspecting apparatus, using pressure and having a means to measure the change in gas pressure while the nozzle is in engagement with the aperture and a means for indicating whether the change is greater or smaller than a predetermined amount, has a nozzle which is formed by a conically shaped surface. The nozzle, when in engagement with the aperture, forms a seal between the conical surface and the inner edge of the flange of the aperture. The nozzle has a passage therethrough wherein pressurized air can flow into the bottle through the conical nozzle. The inwardly extending flange is exposed and any defects such as holes or notches within the flange are detected like holes or leaks in other parts of the bottle by the inspecting apparatus and the bottle will be rejected. Further, the conically shaped surface allows the nozzle to seal in different size bottle apertures.

Preferably, the nozzle is mounted on a laterally extending rod so that the nozzle is moveable laterally into the aperture of the bottle when lying on its side. The nozzle and rod are preferably mounted on a stand which is vertically adjustable to align the nozzle with different sizes and shapes of bottles with apertures at varying vertical heights.

In a preferred embodiment of the invention, the pressure regulating means for the gas supply means comprises a regulator which maintains a given flow rate in the conduit and the regulator further has delay means for delaying the predetermined length of time. Thus, the presence in the line is allowed to build up quickly in a controlled manner within the predetermined time when the nozzle is in sealing relationship with the bottle aperture.

A conveyor, intermittently driven, conveys the bottles to a position in front of the nozzle. Means are provided for detecting bottles with uncut flanges at the bottom thereof. These flange detecting means includes at least one rail adjacent to the conveyor at the nozzle, the rail having an incline so that as bottles with uncut flanges are conveyed by the conveying means, the flanges will ride on the rail and misalign the bottle aperture to prevent proper sealing with the conical nozzle. Thus, during the normal testing cycle no pressure will build up in the gas supply line and the bottles can be sorted.

Further, according to the invention, means are provided for sorting the bottles according to whether the rate at which the pressure builds up in the bottle is as great as or below the predetermined rate. The sorting means comprises an ejector which is operated responsive to detection of the build up of the second predetermined pressure in the gas supply line during the bottle pressurizing cycle and means for actuating the ejector responsive to the detection of the second predetermined pressure. Delay means are provided for operation of the ejector to permit the tested bottles to move from the testing station to the ejection station. Thus, those bottles which have defects continue on the conveyor and are removed from the end of the conveyor. Those bottles which are free from detected defects are rejected from the conveyor with the ejection means which can be pneumatic or mechanical.

In this fashion, an air inspection apparatus allows for the inspection of plastic bottles wherein any leaks, defective apertures, or dents can be detected in a bottle and wherein the bottle is subsequently sorted.

BRIEF DESCRIPTION OF THE DRAWINGS

The invention will now be described with reference to the accompanying drawings in which:

FIG. 1 is a perspective view of a bottle inspection system according to the invention adjacent to a conveyor system for the bottles;

FIG. 2 is a fragmentary, enlarged perspective view of the nozzle and inspector stand as shown in FIG. 1;

FIG. 3 is an enlarged, cross sectional view of the cone as shown in FIG. 2;

DETAILED DESCRIPTION OF THE PREFERRED EMBODIMENT

Figure 4:
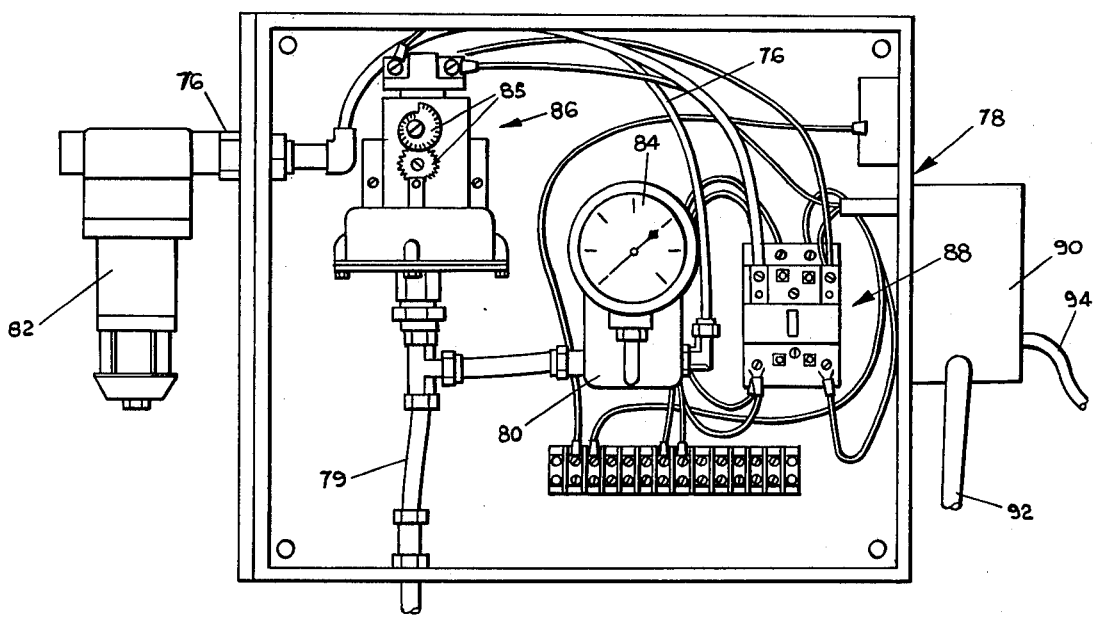
FIG. 4 is a broken, front elevational view of the circuit panel for the bottle inspection system.

Referring particularly to FIG. 1, a bottle inspection apparatus 10 is mounted adjacent a conveyor 12 which conveys blow molded bottles 14 after the bottles 14 exit from a trimmer 16. The bottle inspection apparatus 10 includes an inspection stand 18 located at a first station away from the trimmer 16. An air ejection nozzle 20 is located at a second stand at an opposite side of the conveyor 12. Opposite the air ejection stand 20 is a second conveyor 22 which conveys conforming bottles 14(a). The far end 24 of conveyor 12 carries defective bottles 14(b). A box 26 is located below the end 24 of conveyor 12 to collect defective bottles 14(b).

A guide rail 27 lies adjacent the side of conveyor 12 opposite the inspection stand 18. The guide rail 27 inclines upward from a point before the inspection stand 18.

Hose 98 is connected to a high pressure air compressor (not shown). The air compressor supplies a high pressure air stream, for example between 60 and 80 PSI, and branches off into two branches 98(a) and 98(b). Branch 98(a) leads to a valve switch 97. The valve switch 97 is operated by a continuously driven cam 101 having an assymetric cam lobe 103. When lobe 103 is in contact with valve switch 97, the valve switch is open. Hose 92 leads from valve switch 97 and is coupled to a solenoid valve 90. Operably connected to the discharge side of valve 90 is hose 94 which is coupled to the ejector nozzle 20.

Branch 98(b) leads to a regulator 105 which regulates the air stream to a moderate pressure, for example 11 PSI. Hose 91 couples the regulator 105 to the valve 96. Valve 96 is operated by a second continuously driven cam 100 having an asymetric lobe 102. When lobe 102 is in contact with valve 96, valve 96 allows the air stream to pass from hose 91 to hose 38. When lobe 102 is not in contact with valve 96, valve 96 allows the air stream to pass from hose 91 to hose 40. The pressurized air from hose 38 extends rod 30 from the double acting cylinder 32. The pressurized air from hose 40 retracts rod 30 into the double acting cylinder 32.

Air line 76 leads to an air purifier 82 and then to box panel 78. Leading from box panel 78 is an air line 79. Air line 79 is coupled to conical nozzle 28 which is mounted on extendible rod 30.

Referring particularly to FIG. 2, the inspection stand 18 has a conical shaped nozzle 28 axially mounted onto an extendible rod 30. The extendible rod 30 is operably connected to a double acting cylinder 32. The double acting cylinder 32 has side tube connectors 34 and 36 which are operably connected to air hoses 38 and 40 respectively. The double acting cylinder 32 is mounted on an adjustable stand 42. The adjustable stand 42 includes a base 44. Extending vertically upright from the base 44 are two spaced prongs 46. Vertically aligned slots 50 extend through prongs 46. The prongs 46 are spaced apart to flank a center support shaft 54. The double acting cylinder 32 is mounted on the top of the support shaft 54. Extending from the sides of the support shaft are laterally threaded fasteners 56 which extend through slots 50. Complementary threaded fasteners 58 engage threaded fasteners 56 to adjustably secure the central support shaft 54 to the prongs 46 and 48.

Referring particularly to FIG. 3, the conical nozzle 28 has a tapered end 60. An air passage 62 extends from the side 64 of the conical nozzle 28 to the central axis of the nozzle 28. A central air passage 66 extends from the air passage 62 to a point 68 where the central air passage 66 divides into a plurality of air channels 70 that extend out from the tapered end 60 at openings 71. To the rear of air passage 62 and aligned with the central air passage 66 is a threaded tap 72. The tap 72 threadably engages the extendible rod 30. The conical shaped nozzle 28 can be shaped from round stock of Delrin. The outer end 74 of the air passage 62 is operably connected to air line 79.

Referring to FIG. 4, a box panel 78 has air input line 76 extending through the side of box panel 78. An air regulator 80 is mounted within the box panel 78 and is operably connected to the air line 76. The air regulator 80 is set at a small pressure, for example at 0.75 pounds per square inch gauge pressure. The pressure regulator 80 is a bleed-type regulator which has a slightly delayed response.

An air purifier 82 is mounted at side box panel 78 and is operably connected to the input air line 76. The input air line 76 runs from an air compressor (not shown) to the air regulator 80 having an air pressure gauge 84. A regulated air line 79 runs from the regulator 80 and out of the box panel 78 to the nozzle 28. A pressure sensitive diaphragm switch 86 is operably connected to the output air line 79 and is set to be actuated by a predetermined pressure exceeding the pressure set by the regulator 80, for example, at 1.2 pounds per square inch. Dials 85 are used to set the pressure switch 86. The switch 86 is mounted securely within box panel 78. Electrically coupled to the pressure sensitive diaphragm switch 86 is an electrical relay circuit 88 and the solenoid operated valve 90. The solenoid operated valve 90 is mounted onto a side of the box panel 78.

Figure 5:
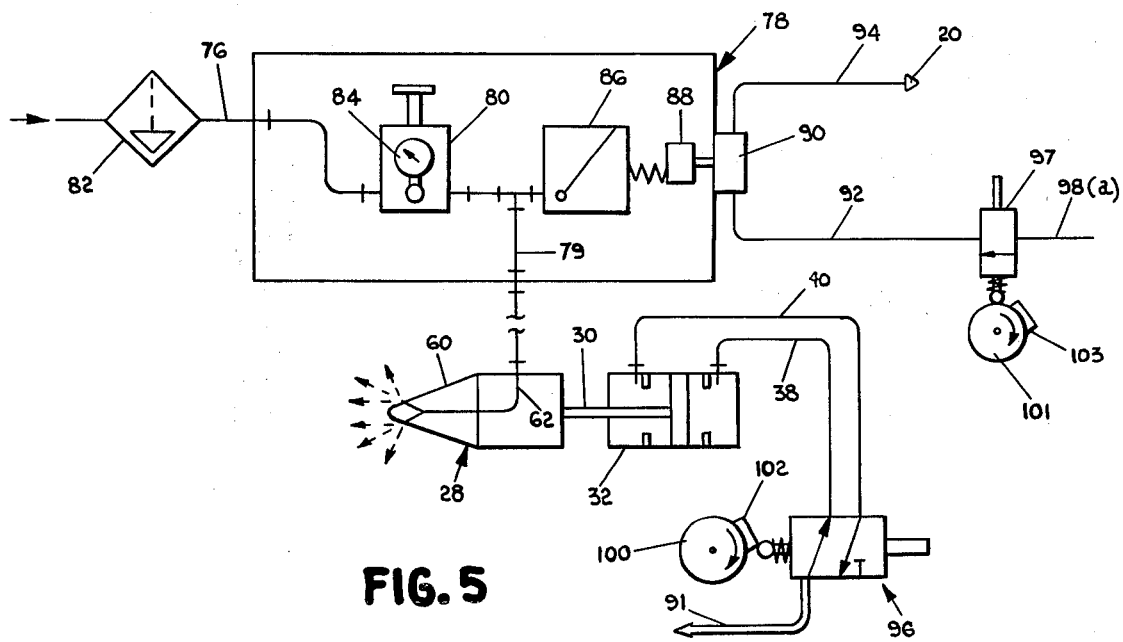
FIG. 5 is a schematic diagram of the operative parts of the pneumatic control circuit for the bottle inspection system.
Figure 6:
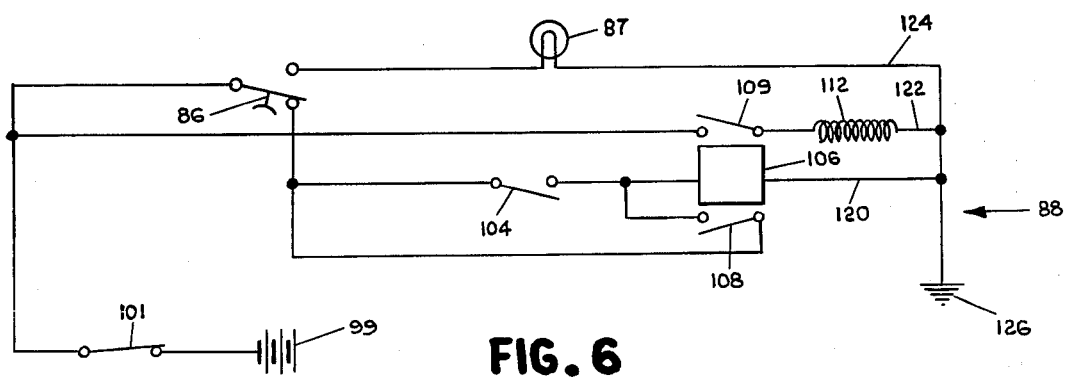
FIG. 6 is a schematic diagram showing the electrical circuit of air inspection system according to the invention.

The operation of the bottle inspection apparatus can be more clearly shown by referring to FIG. 5 and 6. As shown in FIG. 5, the input air stream passes through the air purifier 82 which removes all moisture, and particulate dirt matter from the air stream. The purified air passes through air line 76 and into the air regulator 80 and wherein the pressure is limited to a predetermined low pressure, for example to 0.75 PSI. The air regulator 80 has a slight delay in reacting to higher pressures to relieve excess pressure above the predetermined limit. The air pressure is indicated by air gauge 84. The air stream passes through air line 79 which is coupled to the conical nozzle 28 at the outer end 74 of air passage 62. An air stream is continuously passing through air line 76.

Conveyor 12, as shown in FIG. 1, intermittently moves bottles 14 so that when the conveyor rests, a bottle is aligned in front of the inspection stand 18.

Continuously driven cam 100 is operably timed with the conveyor 12 so that when bottle 14 is aligned in front of the inspection stand 18, the asymmetric cam lobe 102 on rotating cam 100 engages the valve 96. The moderate pressure air stream regulated by regulator 105 passes from air hose 91 to air hose 38. The air passing from air hose 38 enters the back portion of the double acting cylinder 32 so that the extendible rod 30 is extended outwardly. The conical nozzle 28 at the end of the extendible rod 30 partially enters the bottle aperture until the conical tapered side 60 of the conical nozzle 28 abuts the edges 114 of the aperture 15, as shown in FIG. 2, to form a seal. The openings 71 of air channel 70 are within the bottle 14. A continuous low pressure air stream regulated by regulator 80 passes through the air line 79, air passages 62 and 66 and air channel 70 and into the bottle 14. An air pressure is built up within bottle 14. If the bottle 14 has no leaks, flanges, or dents, and the aperture is properly sealed by the conical nozzle 28, the air pressure is built up with sufficient speed to create a pressure within air line 76 beyond the predetermined limit set by the air regulator 80. The slight delay in the air regulator 80 will let the pressure be built up to slightly over the second predetermined pressure that actuates the pressure switch 86 before the lobe 102 disengages from valve switch 96 and the air stream from hose 40 withdraws the conical nozzle from the bottle. After the delay, the air regulator 80 quickly relieves this excess pressure back down to the predetermined limit for the next bottle. A gallon bottle can be inspected in a time span of approximately 2 seconds.

Any excess pressure over the second predetermined pressure actuates the pressure sensitive diaphragm switch 86. Any pressure less than the second predetermined pressure maintains the diaphragm switch 86 in its first position. As indicated in FIG. 6, the pressure sensitive diaphragm switch 86 is operably connected to the electrical circuit 88. The electrical circuit 88 includes a power supply 99, a ground 126, an on-off switch 101, and three circuits 120, 122, and 124. In a relay circuit 120 is reset switch 104. In series with the reset switch 104 is a coil 106. A contact relay switch 108 is also coupled in parallel with the reset switch 104. The contact relay switch 108 is closed when current is passing through coil 106. A solenoid circuit 122 has a solenoid 112 which, when energized, closes the valve 90, and when de-energized, opens the valve 90. In series with solenoid 112 is a contact relay switch 109 which is closed when current passes through coil 106. Circuit 124 has a light 87 coupled in series to diaphragm switch 86. Circuit 124 is closed when diaphragm switch 86 is open in the second position with respect to circuit 120 and is open when diaphragm switch is closed in its first position with circuit 120.

The operation of the ejection nozzle is controlled by electrical circuit 88 and the timing of the cams 100 and 101. Cams 100 and 101 are timed so lobe 103 engages and disengages valve switch 97 before lobe 102 engages valve 96. Cam 101 is set to engage valve switch 97 just when the intermittently driven conveyor stops with bottles aligned with the inspection stand 18 and ejection nozzle 20. After lobe 103 disengages from valve switch 97 but before lobe 102 engages valve 96, reset switch 104 is closed to reset the electrical circuit 88 for inspecting the bottle 14 in front of the inspection stand. The reset switch 104 is reopened immediately thereafter. The reset switch 104 can be operably connected to the operation of the trimmer 16 to achieve this timing. The trimmer 16 has its blade pressed on the uncut flanges of the bottles 14 for an extremely short period of time and can be timed to cut between the engagements of the two lobes 102 and 103 respectively with their corresponding valves.

When the reset switch 104 is closed, the diaphragm switch 86 is in its first position which is closed with respect to circuit 120. Coil 106 has current running therethrough so holding contacts 108 and 109 are then closed. When reset switch 104 reopens, immediately thereafter contacts 108 and 109 remain closed. The holding contact 109, when in its closed position, allows current to pass through blocking solenoid 112 which closes valve 90.

Lobe 102 then engages valve 96 and the conical nozzle 28 is extended into a bottle 14. When a conforming bottle 14(a) is inspected by conical nozzle 28, the buildup in pressure opens the pressure sensitive diaphragm switch 86 with respect to contact 89. The opening of this switch 86 de-energizes the coil 106 and contact relay switch 109 returns to an open position. The solenoid 112 is de-energized, thus opening the valve 90. After the inspection lobe 102 disengages from valve 96 so rod 30 and conical nozzle 28 are retracted, the conveyor 12 starts to move the bottle 14(a) toward the air ejection nozzle 20. Pressure switch 86 recloses with contact 89 but the coil 106 remains de-energized due to the limit switch 104 and holding contact 108 remaining open. The solenoid 112 thus remains deactivated. The conveyor 12 stops so that a subsequent bottle 14 is aligned in front of the inspection stand 18 and the previously inspected bottle is aligned in front of the air ejeciton nozzle 20. The rotating cam 101 engages the valve 97 and a burst of high pressure air is passed from air hose 98 through air hose 92. The burst of air passing through air hose 92 passes through the open solenoid valve 90 to air hose 94 and through air ejection nozzle 20. The high pressure air pushes the inspected conforming bottle 14(a) onto a second conveyor 22 which brings the inspected bottle to the filler plant (not shown). The lobe 103 on cam 101 disengages from valve 97.

The subsequent bottle 14 is then inspected after the reset switch 104 resets and re-energizes the coil 106 and closes contact relays 108 and 109, thus energizing blocking solenoid 112.

If the bottle 14 is nonconforming and has either a defective aperture, leaks, or is dented, pressure sensitive diaphragm switch 86 will not be opened with respect to contact 89 when reset switch 104 is opened. Thus, the coil 106 remains energized and blocking solenoid 112 remains energized. When the subsequent bottle is aligned in front of the inspection stand 18 and the inspected bottle is aligned in front of the air ejection nozzle 20, the solenoid operated valve 90 is closed during the engagement of lobe 103 with valve 97 thus preventing the high pressure air from hose 92 to pass through to hose 94 and to the air ejection nozzle 20. The defective bottle then remains on conveyor 12 until it is dropped off at the end 24 of the conveyor and falls into the box 26.

If the bottle 14(b) has a leak, the buildup in air pressure within the bottle will be slower than in a conforming bottle 14(a) and never be built up beyond the predetermined limit needed to acutate the pressure switch 86 within the time the nozzle 28 is sealed with the bottle aperture 15.

If the bottle has a dent, the air pressure within the bottle will start to blow out the dent, thus retarding the rate at which the air pressure is built up within the bottle. The retarded buildup in pressure will attain an insufficient maximum gauge pressure to actuate the pressure switch 86 before the conical nozzle 28 disengages from the bottle 14. The pressure switch 86 hence will not be actuated and the electrical circuit 88 will detect the bottle as defective.

The bottle ejection apparatus 10 is capable of detecting cuts on the bottle aperture lip 114. The conical nozzle 28 abuts the inner edge of the flange 114 and if any nicks or notches are present with the flange 114, the air will escape therethrough, as in any other leak; thus the pressure sensitive diaphragm switch 86 will not be actuated.

If the bottle 14(b) has an uncut flange 119, the flange will ride up on guide rails 27 thus tilting the bottle 14(b). The aperture 15 will become disaligned with respect to the conical nozzle 28 so a seal will not be created when the nozzle 28 extends toward the aperture 15. The bottle 14(b) will not undergo any buildup in pressure and the bottle will be detected as defective.

The pressure sensitive diaphragm switch 86 is operably coupled to a light 87, as indicated in FIGS. 1 and 6, so that when the pressure sensitive diaphragm switch 86 is open with respect to circuit 120, it is closed with respect to the light circuit 124. A flashing of the light 87 indicates that a conforming bottle 14(a) has been inspected. The light also indicates when the bottle inspection apparatus 10 is properly adjusted. The light should be on for an instantaneous amount of time between the actuation of switch 86 and the disengagement of lobe 103 with valve 96 to indicate that the pressure actuating the diaphragm switch is built up just before the conical nozzle 28 is withdrawn from the bottle aperture 15 and the seal is broken.

Proper adjustment based upon the amount of time the light is on will prevent dented bottles or bottles with small leaks from passing inspection. For a bottle with a small leak, the pressure is built up but more slowly than in a conforming bottle so the seal must be broken before the buildup in pressure in the defective bottle can attain the actuation pressure for switch 86. For a dented bottle, a second buildup in pressure after the dent has been blown out must not occur so the seal is broken beforehand.

In this fashion, a bottle inspection apparatus 10 can inspect and sort conforming bottles 14(a) from defective bottles 14(b). Defective bottles with either defective apertures, uncut flanges, leaks, or dents will be detected by the apparatus and rejected.

It should be understood that the foregoing embodiment of the invention is merely illustrative of the preferred practice of the invention and that various changes and modifications may be made in the arrangements and details of the construction of the embodiment described herein without departing from the spirit and scope of the invention.

The embodiments of the invention in which an exclusive property or privilege is claimed are defined as follows:

1. An apparatus for inspecting for leaks, dents, and other imperfections a plastic bottle having an open filling aperture, the apparatus comprising:
   a nozzle shaped to seal against the bottle aperture and having means providing a sealing surface with the bottle aperture when the nozzle is in engagement with the aperture, the nozzle further having a passage therethrough;
   means for supplying gas at a first predetermined pressure to the nozzle air passage so that air can be supplied to the bottles when the nozzle is in sealing engagement with the apertures thereof;
   means for measuring the rate at which the pressure builds up in a bottle to a second predetermined pressure above the first predetermined pressure when the nozzle is in sealing engagement with the aperture thereof; and
   means coupled to the measuring means for indicating whether the rate at which the pressure buildup in the bottle is as great as or below a predetermined rate; whereby the presence of holes, as well as dents and deformations in the bottle, can be detected with the inspecting apparatus.

2. An apparatus for inspecting plastic bottles according to claim 1 wherein:
   the gas supply means includes a conduit communicating with the nozzle passage;
   the rate measuring means comprises a pressure sensitive switch in the conduit to detect the presence of the second predetermined pressure in the gas supply means conduit;
   means for moving the nozzle and the bottle with respect to each other in a timed cycle such that the nozzle is in sealing engagement with the bottle aperture for a predetermined length of time; and
   means regulating the pressure in the gas supply means conduit such that the pressure in the conduit reaches the second predetermined pressure just before the end of the predetermined length of time when the nozzle is in sealing relationship with an aperture of a perfect bottle.

3. An apparatus for inspecting bottles according to claim 2 wherein the rate indicating means comprises a circuit including the pressure sensitive switch, the switch affecting the current flow through the circuit when the second predetermined pressure is detected by the pressure sensitive switch; and further comprising:
   an ejector spaced from the nozzle for ejecting bottles from a given path of travel;
   means for moving the bottles from the nozzle to the ejector;
   means electrically coupled in the circuit for actuating the ejector responsive to the detection of the predetermined pressure by the pressure sensitive switch; and
   delay means in the circuit for delaying any actuation of the ejector until the bottle has moved from the nozzle to the ejector.

4. An apparatus for inspecting bottles according to claim 3 wherein the pressure regulation means comprises a regulator which maintains the pressure in the conduit at the first pressure, the regulator futher having delay means for delaying the effective operation of the regulator to reduce the pressure in the conduit to the first pressure for the predetermined length of time such that the pressure in the line is allowed to build up in a controlled manner within the predetermined time when the nozzle is in sealing relationship with the bottle aperture.

5. An apparatus for inspecting bottles according to claim 4 wherein the nozzle is shaped to fit within the bottle aperture and the sealing surface means provides a sealing surface against the bottle aperture when the nozzle is inserted therein.

6. An apparatus according to claim 5 wherein the sealing surface means is formed by a conical shaped surface on the nozzle whereby defects in flanges formed by the bottle aperture can be detected.

7. An apparatus for inspecting bottles according to claim 6 wherein the nozzle and the bottle relative moving means comprise an extendible rod upon which the nozzle is mounted and means for moving the extendible rod toward and away from the bottle apertures to force the conical shaped surface of the nozzle into sealing engagement with the bottle aperture.

8. An apparatus for inspecting plastic bottles according to claim 7 and further comprising means for laterally adjusting the position of the nozzle with respect to the bottles to accommodate bottles of different dimensions.

9. An apparatus for inspecting plastic bottles according to claim 8 and further comprising means for detecting bottles with uncut flanges at the bottom thereof.

10. An apparatus for inspecting plastic bottles according to claim 9 and further comprising means for conveying the bottles to the nozzle; and wherein the means for detecting uncut flanges include at least one rail adjacent to the conveying means at the nozzle, the rail having an incline so as bottles with uncut flanges are conveyed by the conveying means the flanges will ride up on the rail to misalign the bottle aperture from proper sealing relationship with the conical nozzle.

11. An apparatus for inspecting plastic bottles according to claim 2 wherein the pressure regulator means comprises a regulator which maintains the pressure in the conduit at the predetermined first pressure and at a given flow rate, the regulator having delay means for delaying the effective operation of the regulator to reduce the pressure in the conduit to the first pressure for the predetermined length of time such that the pressure in the line is allowed to build up in the controlled manner within the predetermined time when the nozzle is in sealing relationship with the bottle aperture.

12. An apparatus for inspecting plastic bottles according to claim 11 and further comprising means coupled to the indicating means for sorting the bottles depending on whether the rate at which the pressure builds up in the bottles is as great as or below the predetermined rate.

13. An apparatus for inspecting plastic bottles according to claim 2 wherein the nozzle and the bottle relative moving means comprise an extendible rod upon which the nozzle is mounted and means for moving the extendible rod toward and away from the bottle aperture to force the sealing surface means of the nozzle into sealing relationship with the bottle aperture.

14. An apparatus for inspecting plastic bottles according to claim 1 wherein the sealing surface means is formed by a conical shaped surface on the nozzle whereby defects in flanges formed at the bottle apertures can be detected.

15. An apparatus for inspecting plastic bottles according to claim 1 and further comprising means for detecting bottles with uncut flanges at the bottom thereof.

16. An apparatus for inspecting plastic bottles according to claim 15 and further comprising means for conveying the bottles to the nozzle, and wherein the means for detecting uncut flanges include at least one rail adjacent the conveying means at the nozzle, the rail having an incline so that as bottles with uncut flanges are conveyed by the conveying means, the flanges will ride up on the rail and be directed so as to misalign the bottle aperture from proper sealing with the nozzle.

17. An apparatus for inspecting plastic bottles according to claim 1 and further comprising means coupled to the indicating means for sorting the bottles depending on whether the rate at which the pressure builds up in the bottles is as great as or below the predetermined rate.

18. In a bottle inspecting apparatus having a nozzle which can be positioned in a sealed engagement with a bottle aperture, the bottle molded from plastic, having a bottle neck and aperture at the end of the neck, the aperture having an inwardly extending flange which engages a corresponding ridge in a cap to form a seal with the cap, means for supplying a gas pressure through the nozzle to the interior of an inspected bottle, means for measuring the change in gas pressure within the bottle while in sealed engagement with the nozzle, means coupled to the measuring means for indicating whether the change of pressure within the bottle is greater or less than a predetermined rate whereby the presence of holes, leaks, or other deformities can be detected, means for sorting the bottles into a defective group and conforming group dependent on the sensing of indicating means; the improvement which comprises:

the nozzle having a smooth conical shaped surface which abuts and seals the aperture at only an inner edge of the aperture so as to expose any inwardly extending flange the aperture may have which forms a seal with a ridge of an engaging cap; and a passageway extending through the conical surface for gas to pass therethrough into the interior of the bottle whereby any leaks, holes, or imperfections within the flange may also be detected by the inspecting apparatus.

19. A method for inspecting plastic bottles for leaks, dents, and other imperfections, the method comprising:

injecting gas into the bottle at a first predetermined pressure;

allowing the pressure to build up in the bottle above the first predetermined pressure;

measuring the rate at which the pressure builds up in the bottle to a second predetermined pressure in excess of the first predetermined pressure; and sorting the bottles according to whether the rate of pressure buildup in the bottle is as great as or falls below a predetermined rate.

* * * * *